(12) United States Patent
Herrig et al.

(10) Patent No.: US 12,435,695 B2
(45) Date of Patent: Oct. 7, 2025

(54) DEVICES AND METHODS FOR MITIGATING VIBRATIONS IN WIND TURBINE BLADES

(71) Applicant: LM WIND POWER A/S, Kolding (DK)

(72) Inventors: Andreas Herrig, Garching (DE); Satya Mohan Vamsi Andalam, Bengaluru (IN)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/291,567

(22) PCT Filed: Jul. 22, 2022

(86) PCT No.: PCT/EP2022/070660
§ 371 (c)(1),
(2) Date: Jan. 23, 2024

(87) PCT Pub. No.: WO2023/002032
PCT Pub. Date: Jan. 26, 2023

(65) Prior Publication Data
US 2024/0263610 A1    Aug. 8, 2024

(30) Foreign Application Priority Data

Jul. 23, 2021 (EP) ...................... 21187536

(51) Int. Cl.
*F03D 80/50* (2016.01)
*F03D 1/06* (2006.01)

(52) U.S. Cl.
CPC .......... *F03D 1/06495* (2023.08); *F03D 80/50* (2016.05); *F05B 2230/60* (2013.01); *F05B 2260/964* (2013.01); *F05B 2280/5006* (2013.01)

(58) Field of Classification Search
CPC ...... F03D 1/06495; F03D 80/00; F03D 80/50; F03D 7/0268
See application file for complete search history.

(56) References Cited

U.S. PATENT DOCUMENTS 9,316,202 B2 *  4/2016  Bech ........................ F03D 80/00
10,288,039 B2 *  5/2019  Chen ....................... F03D 80/50
(Continued)

FOREIGN PATENT DOCUMENTS

EP        2565440 A2 *  3/2013  ............ B66C 1/108
EP        3112667 A1     1/2017
(Continued)

*Primary Examiner* — Justin D Seabe
(74) *Attorney, Agent, or Firm* — Nath, Goldberg & Meyer; Jerald L. Meyer; Tanya E. Harkins

(57) ABSTRACT

The present disclosure relates to devices for wind turbine blades and methods for reducing vibrations in wind turbines. More particularly, the present disclosure relates to devices for mitigating vortex induced vibrations and stall induced vibrations, wind turbine blades comprising such devices, and methods for reducing wind turbine vibrations when the wind turbine is parked, especially during wind turbine installation and/or maintenance. A method for mitigating vibrations of a parked wind turbine comprises arranging a device in an inactive state with a wind turbine blade; and causing the device to transition to an active state in which the device grips the wind turbine blade more strongly than in the inactive state.

14 Claims, 7 Drawing Sheets

(56) References Cited

U.S. PATENT DOCUMENTS

| | | | |
|---|---|---|---|
| 10,337,540 B2 * | 7/2019 | Wardropper | F03D 80/50 |
| 10,352,062 B2 * | 7/2019 | Fletcher | F03D 80/50 |
| 11,867,156 B2 * | 1/2024 | Herrig | F03D 80/50 |
| 12,071,924 B2 * | 8/2024 | Canal Vila | F03D 1/0658 |

FOREIGN PATENT DOCUMENTS

| | | | | |
|---|---|---|---|---|
| EP | 3514099 A1 * | 7/2019 | | B66C 1/108 |
| EP | 3795824 A1 | 3/2021 | | |
| WO | 2013/091655 A1 | 6/2013 | | |
| WO | 2016/107624 A1 | 7/2016 | | |

* cited by examiner

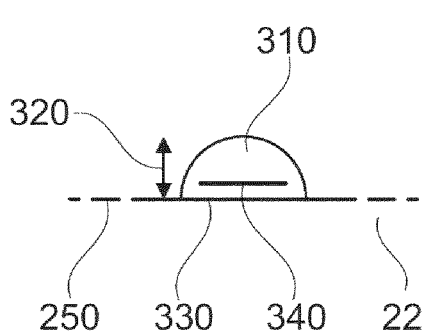
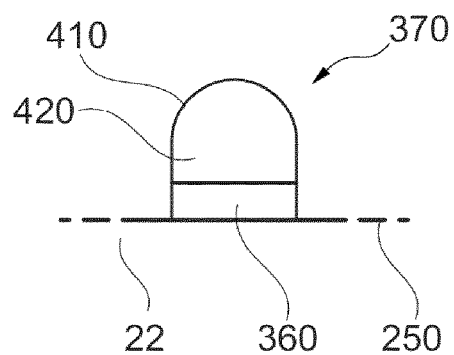
Fig. 4D Fig. 4E
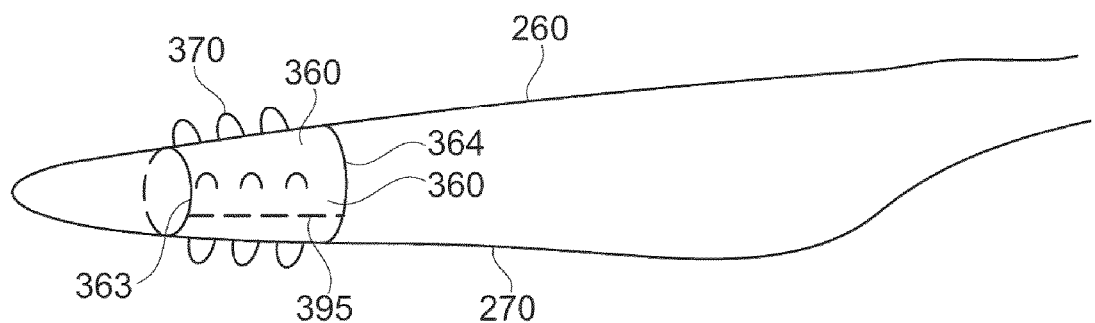
Fig. 5A
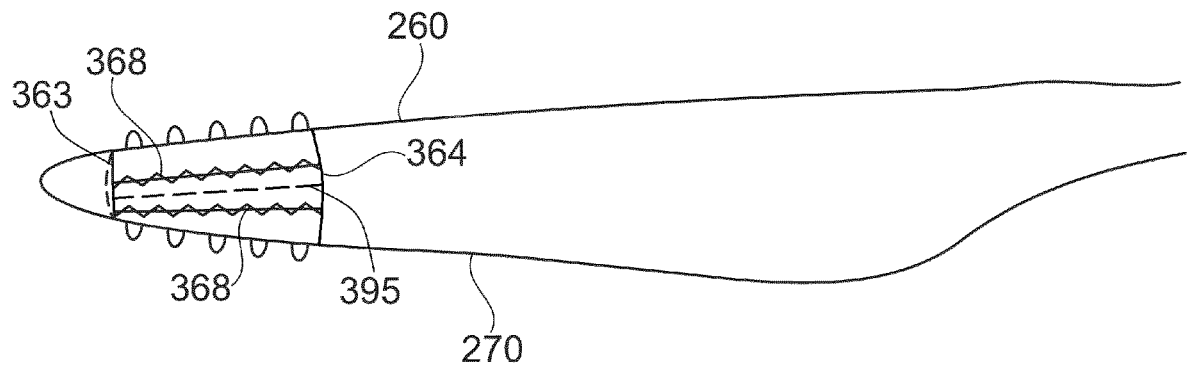
Fig. 5B

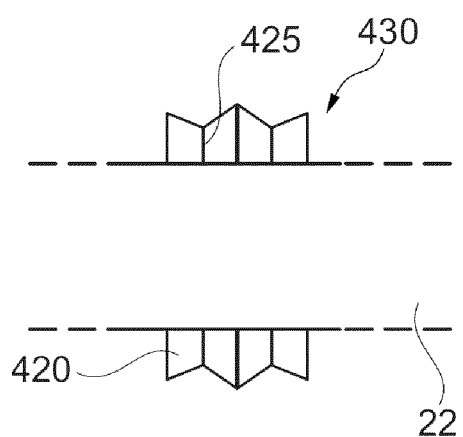
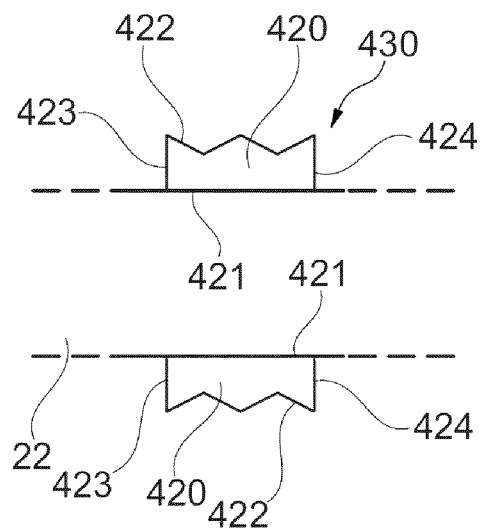
Fig. 6B          Fig. 6C
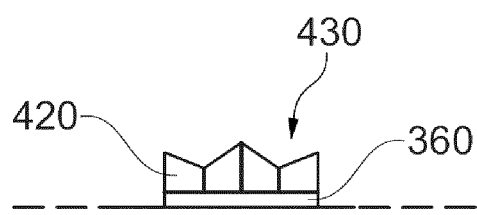
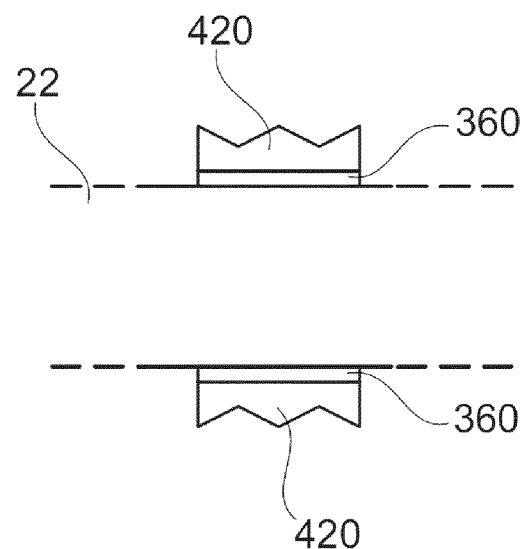
Fig. 6D          Fig. 6E

DEVICES AND METHODS FOR MITIGATING VIBRATIONS IN WIND TURBINE BLADES

This is a National Phase Application filed under 35 U.S.C. 371 as a national stage of PCT/EP2022/070660, filed Jul. 22, 2022, an application claiming the benefit of European Application No. 21187536.4, filed Jul. 23, 2021, the content of each of which is hereby incorporated by reference in its entirety.

The present application claims the benefit of EP21187536.4 filed on Jul. 23, 2021.

The present disclosure relates to devices for wind turbine blades and methods for reducing vibrations in wind turbines. More particularly, the present disclosure relates to devices for mitigating vortex induced vibrations and stall induced vibrations, wind turbine blades comprising such devices, and methods for reducing wind turbine vibrations when the wind turbine is parked, especially during wind turbine installation and/or maintenance.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. That makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, increase the need of repairs and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, a device for mitigating vibration of a parked wind turbine is provided. The device comprises one or more air flow modifying elements. The device is configured to transition from an inactive state to an active state. The device is configured to grip a wind turbine blade more firmly in the active state than in the inactive state.

According to this aspect, a device can be provided in an inactive state. If arranged with, e.g. placed around, a portion of a wind turbine blade in the inactive state, the device may not be able be able to grip the wind turbine blade at all or the device may be able to grip the blade with a certain strength, i.e. it may be able to exert some pressure against the blade. When acting on or activating the device and causing the device to transition to an active state, the device grips the wind turbine blade more firmly than in the inactive state. In use, the device may modify the air flowing around the wind turbine blade and avoid, or at least reduce, vortex and/or stall induced vibrations.

Throughout this disclosure, a device in an active state may be understood as a device which, in use, i.e. when mounted to a wind turbine blade, presses against an external surface of the wind turbine blade more than in an inactive state.

Throughout this disclosure, a device in an inactive state may be understood as a device which does not grip a wind turbine blade when arranged over or around it, or at least that it does not do so as strongly as it does when it is in the active state.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Herein it may be understood that a wind turbine is in operation when its rotor is rotating at a speed high enough to produce energy and the generator of the wind turbine is producing electrical power.

Throughout this disclosure, an airflow modifying element may be understood as an element configured to significantly disturb the air flow, e.g. its magnitude and/or its direction, around a wind turbine blade. In particular, the airflow modifying element may be configured to make the airflow more turbulent and/or disturb at least an airflow advancing in a spanwise direction of the wind turbine blade.

In a further aspect of the disclosure, a method for mitigating vibrations in a parked wind turbine is provided. The method comprises arranging, with a wind turbine blade, a device in an inactive state. The device comprises one or more airflow modifying elements. The method further comprises securing the device to the blade by causing the device to transition from the inactive state to the active state. The device grips the wind turbine blade more firmly in the active state than in the inactive state.

Still in a further aspect of the disclosure, a method for mitigating vibrations of a parked wind turbine is provided. The method comprises arranging an inflatable device around a wind turbine blade. The method further comprises inflating the device. Inflating enables the device to disturb air flow around the wind turbine blade.

BRIEF DESCRIPTION OF THE DRAWINGS

FIGS. 4A, 5A, 5B and 6A schematically illustrate perspective views of examples of devices for mitigating vibrations arranged on a wind turbine blade;

FIGS. 4B, 4C, 4D and 4E schematically illustrate examples of partial cross-sections of the device of FIG. 4A along line A-A;

FIGS. 6B, 6C, 6D and 6E schematically illustrates examples of cross-sections of the device of FIG. 6A along line C-C;

DETAILED DESCRIPTION OF EXAMPLES

Figure 1:
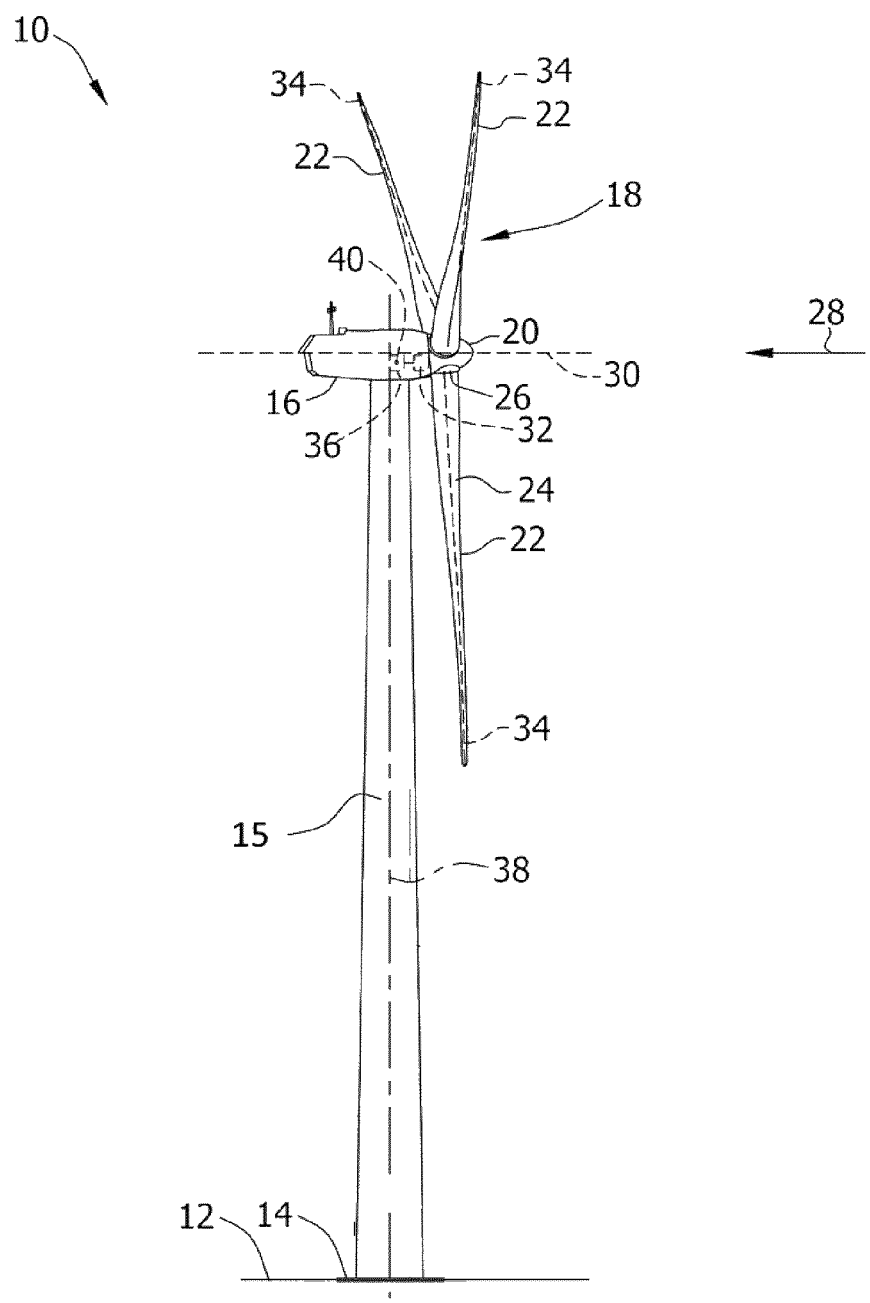
FIG. 1 illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
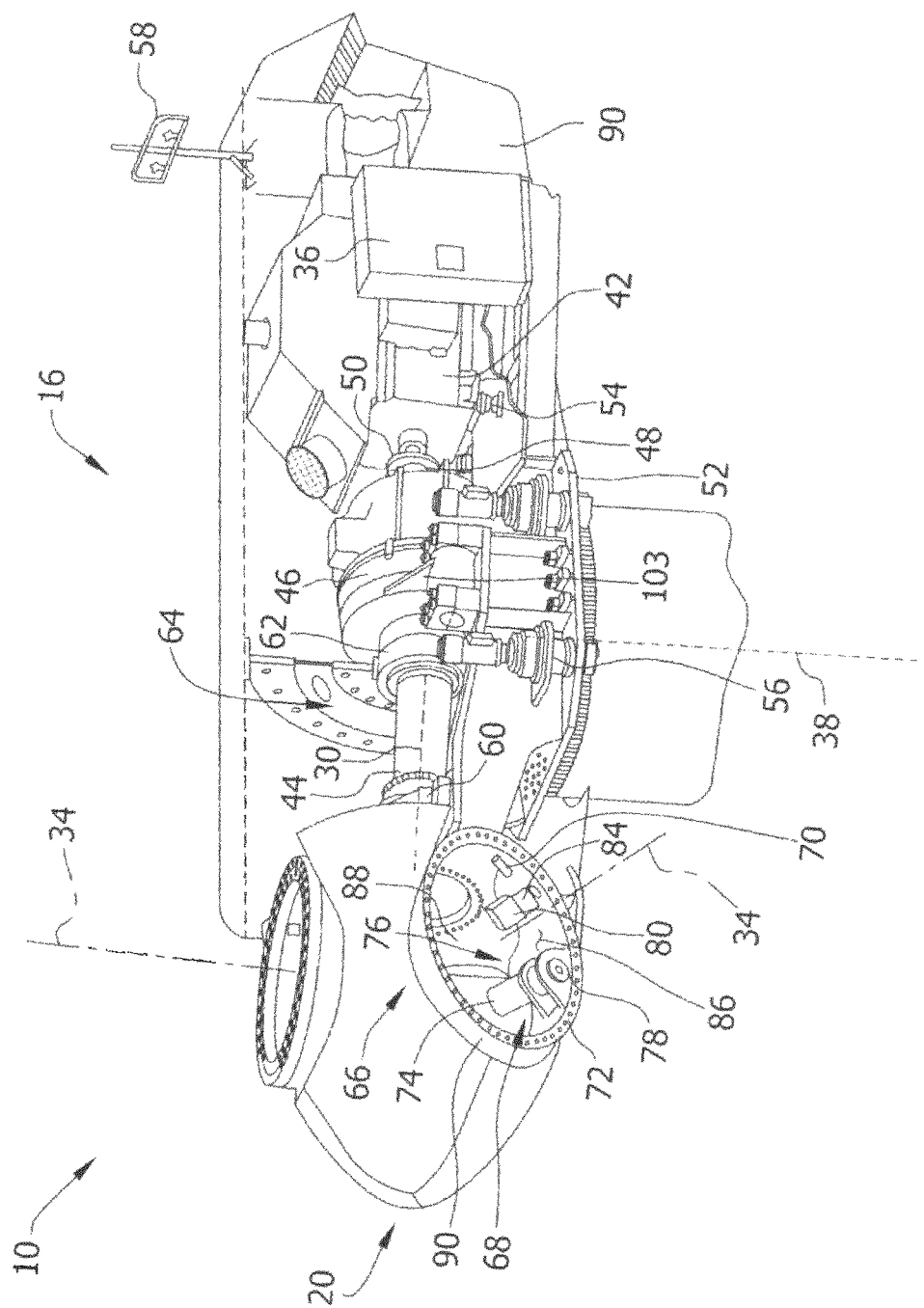
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
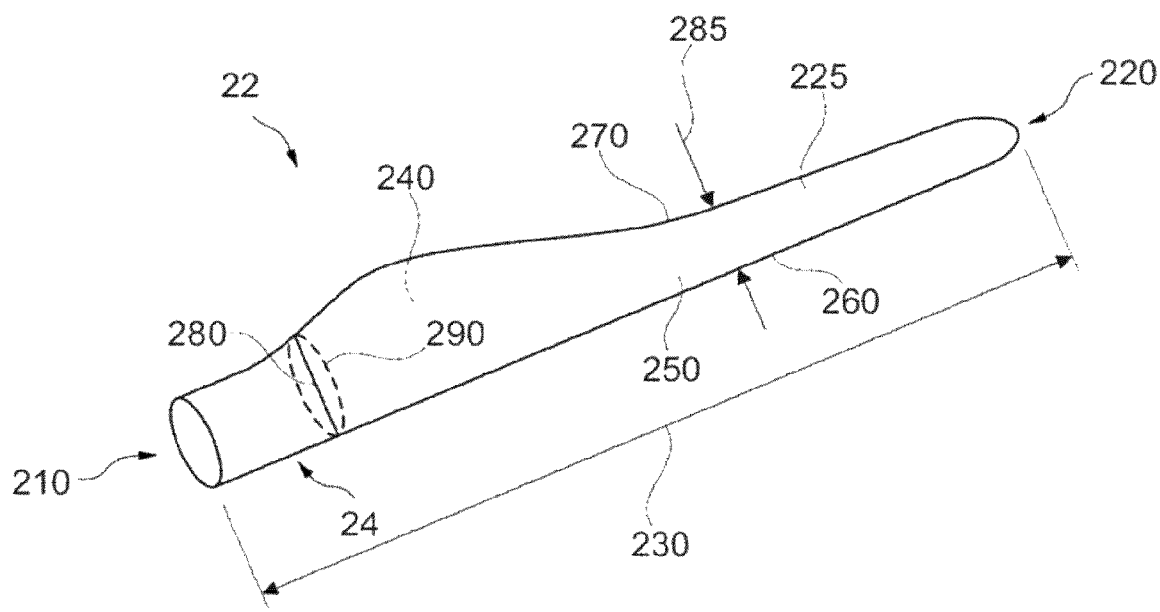
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub 20 of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 22 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind turbine blades and the wind turbine. The wind turbine rotor may or may not be locked in these situations.

At least two types of oscillations or vibrations may happen particularly when the turbine is parked. The first ones are so-called vortex induced vibrations (VIVs), and these can arise when an angle of attack for a blade or airfoil portion is around 90 degrees. Vortex shedding may contribute to enhance the wind turbine blade oscillation. The second type of oscillations are stall induced vibrations (SIVs) which can arise when the angle of attack is close to stall angles (e.g. 15 degrees-30 degrees). The angle of attack may be understood as a geometrical angle between a flow direction of the wind and the chord of a rotor blade or a local chord of a rotor blade section.

Devices 300 as described herein may reduce vibrations when the wind turbine is parked. The performance of the wind turbine may not be negatively affected as the device(s) may be removed before the wind turbine starts normal operation. One or more devices 300 may be particularly useful during installation and/or commissioning of a wind turbine. It may be also useful if the wind turbine is stopped, e.g. for maintenance.

A device 300 for mitigating vibrations of a parked wind turbine is provided. The device comprises one or more airflow modifying elements. The device is configured to transition from an inactive state to an active state. The device is configured to grip a wind turbine blade more firmly in the active state than in the inactive state.

FIGS. 4A to 6E schematically show some examples of such devices 300.

In some examples, e.g. in FIGS. 4A-4E, the device may comprise a shape memory material, and the device may be configured to transition from the inactive state to the active in response to the activation of the shape memory material. A shape memory material may be understood as a material that has one or more properties that are affected in a controlled manner by some external stimuli such that the material is able to change from a first state (e.g. a deformed temporary shape) to a second state (e.g. an original default shape) in response to the stimuli.

I.e., activating on the device, e.g. by applying a stimulus such as heat or light to it, may change its shape. In this way, in an inactive state, the device may have a first shape, and when for example heat is applied to the device, its shape changes, causing it to grip a wind turbine blade. In the active state, the device has therefore a second different shape.

Figure 4A:
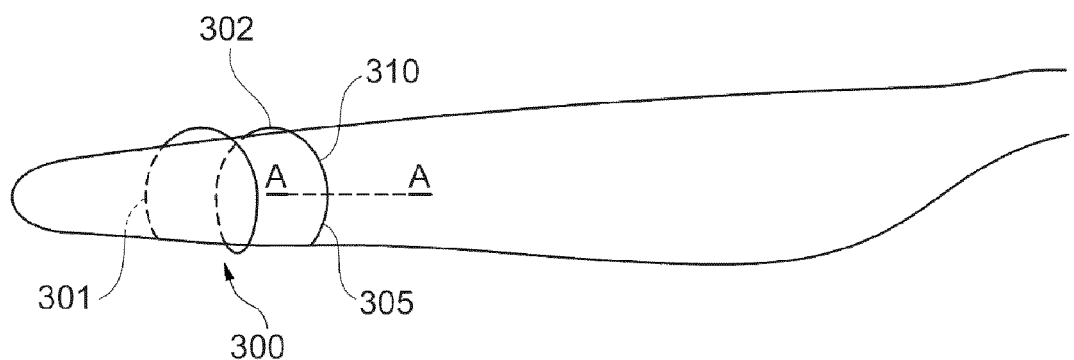

An example of a device 300 comprising a shape memory material is illustrated in FIG. 4A. In this figure, the device is shown in an active state attached to a wind turbine blade 22. The device may be entirely made of one or more shape memory materials in some examples. In other examples, one or more shape memory materials may be included only in some portions of the device, e.g. along one or more longitudinal portions of the device 300. By activating such portions, the device 300 may be secured to the blade. Shrinking of the device 300 may, no matter whether the device includes shape memory material(s) along its entire length or only along some portions of it, may occur along a length of the device and/or along a height 320 of the device. In some examples, the device 300 may shrink along a length of the device and it may expand along a height of the device. This may enable a suitable attachment to the blade 22.

In the active state, the device 300 has a spiral or helicoidal shape, thereby surrounding a wind turbine blade 22. In an inactive state, the device has a different shape or at least a different size. For example, the device may still have a spiral or helicoidal shape in an inactive state, but with loosen or less tight loops. When subjected to an appropriate stimulus, it may shrink and press the outer surface, e.g. pressure side 240 and suction side 250 surfaces, of the wind turbine blade 22. Appropriate stimulus may e.g. include heat, light, electric fields and magnetic fields.

In some other examples, the device 300 in the inactive state may be substantially straight, for example a straight tube, and only when acted on it starts to curve around the wind turbine blade 22 for gripping the blade. Storing and transporting substantially straight, non-curved, devices may be easier and more efficient that storing and transporting curved devices. Still in other examples, the shape of the device in the inactive state may be different from the options mentioned herein.

The device 300 may comprise one or more shape memory materials, including shape memory alloys, shape memory polymers and/or shape memory hybrids.

When in use, the device 300 may help to modify the air flowing around the wind turbine blade 22. For example, the air flowing around the blade may encounter the device, which hinders the advancing of the air flow. The air may become more turbulent after leaving behind the device. Hindering the advancing of the air flow may decorrelate the vortex sheddings at the spanwise location of the device and other vortex shedding at other spanwise positions of the blade. Making the vortex sheddings uncoherent along a length 230 of the blade 22 may reduce VIVs.

Also, the helicoidal shape of the device 300 may alter the separation patterns of the local flow. The negative slopes of the lift curve may therefore be reduced and SIVs may accordingly be mitigated.

The device may comprise several loops in the active state. For example, a first loop 301 and a second loop 302 can be provided. Having more than one loop, e.g. two, three, four, or more loops, may help to enhance the effect of decorrelation of the vortex sheddings.

Figure 4B:
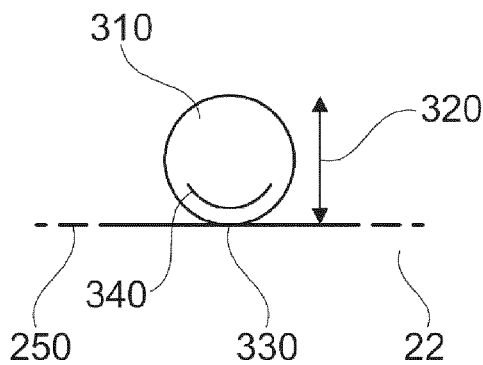

FIG. 4B shows several examples of partial cross-sections of the body 310 of the device 300 of FIG. 4A. The body 310 of the device 300, or the device as such, may be seen as an air flow modifying element. Cross-sections in this figure have been taken along line A-A of FIG. 4A. Only a portion of the device 300 and the blade 22 is illustrated. The device 300 has a height 320 such that when the device is mounted to a wind turbine blade, the air flow can be disturbed. A height 320 may be about 5% to 10% of a chord length 285. A chord length may be understood as an average length of the chords along the length 230 of the blade 22. A height 320 may be measured in a direction substantially perpendicular to a local surface of the wind turbine blade 22 to which the device is attached in some examples. A blade side 330 of the device 300, i.e. a side of the device configured to face a blade external surface, does not need to touch the surface of the wind turbine blade along all the length of the device, and thus a direction in which the height 320 is measured does not need to be always substantially perpendicular to the outer surface of the wind turbine blade. Thus, FIG. 4B is merely illustrative. A length of the device 300 is perpendicular to the plane of FIGS. 4A-4E in the cross-sections shown.

It should be noted that the device of FIG. 4A may have a varying cross-section along its length. That is to say, a height 320 and a width (dimension substantially perpendicular to the height 320) of the device 300 may vary along the length of the device.

Device 300 may comprise a heating element 340 for heating the shape memory material. A heating element may be understood as an element in direct contact with the device which can be heated. When the element is heated, the temperature of the device increases and triggers its change of shape. For example, a film, a wire or a tube which can be heated may be provided extending along the length the device, e.g. inside the device. In some other examples, the device 300 may comprise one or more wires of shape memory material(s) along a total or partial length of the device, and one or more coils may heat the wires. One or more coils may e.g. wrap the wires. Still in some other examples, an illuminating element may be provided. In general, an activating element configured to stimulate the shape memory material may be provided.

In some other examples, a heating element 340 does not need to be included with the device 300. The ohmic resistance of the shape memory material(s) may in some examples be sufficient for self-heating when circulating a current through the shape memory material(s). Alternatively, a stimulus such as heat or light may be directly applied by an operator to the device 300. For example, the device 300 may be illuminated with specific light from a light source, and the light triggers the contraction of the device. The light may for example be infrared light.

An energy source 350 may be provided for increasing the temperature of the heating element. For example, a battery may be configured to apply a voltage to the heating element such that heat is dissipated through the element, increasing its temperature. Then, the device 300 is heated too, thereby changing its shape and/or causing it to shrink. An energy source may be provided in general for supplying energy to the activating element.

In some examples, the energy source may be provided with the device 300, e.g. inside the device, such that each device that is to be attached to a wind turbine blade 22 has its own energy source for activating the device. In some other examples, the energy source may not be provided with the device, but it may be an external energy source which can be connected to the heating element 340 of the device 300. An operator may carry the energy source and use it to heat each device 300 to fit them around a wind turbine blade 22.

The number and arrangement of energy sources 350 to be used to heat a device 300, or at least the position at which the transfer of energy takes place from the energy source(s) 350 to the heating element 340, may be selected depending on how it is desired that the deformation of the device 300 proceeds. For example, one energy source 350 or connection 355 to a heating element 340 may be provided at a longitudinal end 305 of a device 300, or a plurality of energy sources or connections to a heating element 340 may be provided along a length of the device 300. The way in which the device shrinks and changes its shape in each case will be different.

A device 300 may be arranged in a tip region 225. The tip region may be the portion of the wind turbine blade that vibrates the most when the wind turbine is parked. Therefore, it may be particularly advantageous to fit the device in this region of the blade.

More than one device 300 may be attached to the wind turbine blade 22. The distance between two consecutive devices attached to a blade in a spanwise direction may be such that the air flow encounters two obstacles on its way (if the devices 300 were too close, they may act as a one bigger single device instead of providing two local disruptions of the air flow around the blade 22). This may help to further decorrelate vortex sheddings along a length 230 of the wind turbine blade and to attach the air flow to the blade. In some examples, two devices 300 may be separated between one and five chord lengths 285. In this aspect, a chord length may be understood as an average length of the chords along the length of the blade 22.

Figure 5C:
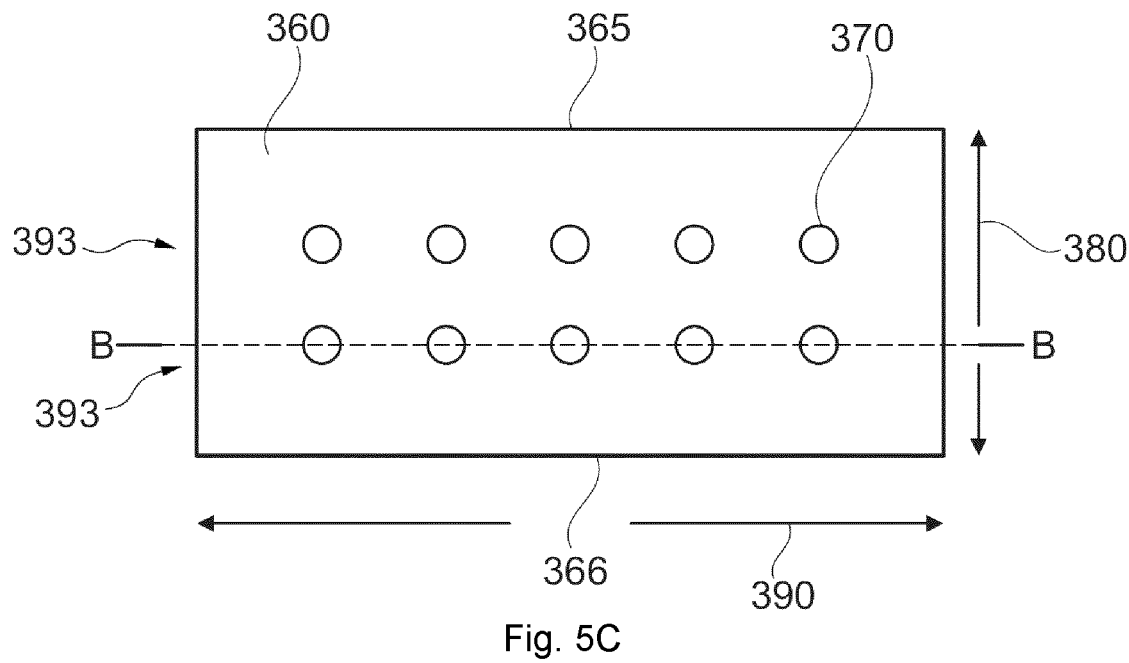
FIG. 5C schematically illustrates a top view of the device of FIG. 5B in an extended configuration.
Figure 5D:
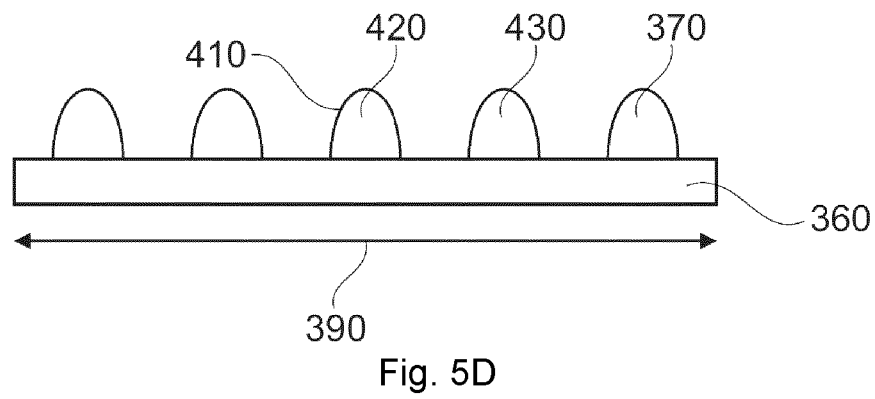
FIG. 5D schematically illustrates a cross-section of the device of FIG. 5C along line B-B.

Another example of a device 300 for mitigating vibrations of a parked wind turbine is provided in FIGS. 5A-5D. In FIGS. 5A and 5B, the device is fitted around a wind turbine blade 22 and comprises a base 360 and a plurality of protrusions 370. The base 360 is configured to face a surface of a wind turbine blade 22, e.g. pressure side 240 and suction side 350 surfaces. The protrusions 370 are configured to extend away from the surface of the wind turbine blade in the active state. A top view of the device 300 of FIG. 5B in an extended configuration is provided in FIG. 5C. A cross section of the device of FIG. 5C along line B-B is shown in FIG. 5D.

The base 360 may comprise a shape memory material. The above description in relation to shape memory materials and the device 300 of FIGS. 4A-4D also apply to base 360. For example, the base 360 may include a heating element 340 (in general an activating element), such that when the heating element 340 increases its temperature, the temperature of the base 360 increases as well, and the base 360 shrinks around a wind turbine blade 22.

It is also possible that the base 360 comprises more than one activating element 340. For example, two or more heating elements 340, e.g. three, four, five or more heating elements may be arranged inside the base 360, e.g. substantially parallel along a length 380 or a width 390 of the base 360. A plurality of heating elements 340 may also be included in the device 300 of FIGS. 4A-4D. In use, a length 390 of the base 360 may be measured along a spanwise direction and a width 380 of the base 360 may be measured along a chordwise direction. In FIG. 5C the length 390 is bigger than the width 380 of the base 360, but the opposite, i.e. dimension 380 greater than dimension 390, may also be possible.

In some other examples, the base 360 does not need to include a heating element 340, but the base 360 may be caused to transition from an inactive state to an active state by an operator stimulating the base 360, e.g. by directly heating it or by illuminating it with light of a suitable wavelength.

Still in some other examples, the base 360 may not comprise one or more shape memory materials.

Independently of the base 360 including or not one or more shape memory materials, the base 360 may be provided in a closed configuration. For example, the base 360 may have an annular cross-section and/or the base 360 may have a tubular shape. A base 360 in a closed configuration may be referred to as a sleeve. In other examples, the base 360 may be provided in an open configuration. In an open configuration, two opposite edges 365, 366 of the device 300, e.g. the edges configured to extend in a spanwise direction when placing the device around the blade 22, may not be joined.

One or more tensioning elements 368 may be provided along a length 390 of the base 360. A tensioning element, which extends between edges 363 and 364 of the base 360 in FIG. 5B, may be configured to extend, when the device is in use 300, along a spanwise direction. A tensioning element 368 is configured to provide a reliable tension to the base 360 and to accommodate variations in shape of a blade 22 and/or variations in shape between different blades 22. If a perimeter in cross-section changes along a length 230 of the blade 22, the tensioning element(s) 368 may deform, and in particular may stretch and compensate for that change by bridging a gap between two edges of the base 360, thus adapting the base 360 to the blade 22. The stretching capability of the tensioning element(s) 368 may also facilitate using a same base 360 for blades 22 of different sizes. A tensioning element 368 may e.g. be a deformable, resilient or elastic element such as a rubber strap winding or an elastic garment.

A base 360 may comprise one or more shape memory materials and one or more tensioning elements 368 in some examples. In other examples, tensioning elements 368 may not be provided in a base 360 which already comprises one or more shape memory materials.

In some examples, the base 360 of the device 300 may comprise a release element 395. The release element 395 may be configured to removably attach the base 360 to the wind turbine blade 22. The release element may therefore help to detach the base 360 from the blade 22 when the device 300 is no longer needed, i.e. before starting to operate the wind turbine 22. A release element may be a zipper or a hook-and-loop fastener such as Velcro™. The release element 395, which extends between edges 363 and 364 of the base 360 in FIG. 5A, may be configured to extend, when the device is in use 300, along a spanwise direction.

One or more tensioning elements 368 may be used in combination with a release element 395. This may be seen in FIG. 5B. In this example, a zipper 395 may for example be used to removably attach the base 360 to the blade 22, and two tensioning elements 368 may help to adapt the base 360 to the blade 22 contour when closing the zipper. The tensioning elements 368 may be provided substantially adjacent the release element 395.

In some examples, the base 360 may comprise perforations for facilitating the removal of the device 300. Perforations may be arranged in a specific pattern. Such pattern including a plurality of perforations may be referred to as frangible or tearable pattern. For example, perforations may form a substantially straight line along a length 390 or a width 380 of the base 360. The line may be referred to as tearable or frangible line. By acting on the perforated pattern, the base 360 may be separated from the blade 22.

Release element(s) 395 and/or frangible or tearable pattern(s) may be provided in other examples of a device 300. For example, the device 300 of FIGS. 4A-4D may include a removable attachment or a tearable pattern for removing the device 300 from a blade 22. Such ways of removing a device 300 may be useful if the device 300 includes a one-way shape memory material, i.e. if transitioning from an active state back to the inactive state is not possible.

The protrusions 370 of the device 300 extend from its base 360. The protrusions 370 may be configured to be arranged along at least the leading edge 260 in the activated state of the device. The protrusions can be grouped in rows 393. For example, two rows 393 of protrusions may be provided. Each of the rows 393 may be configured such that, when the device 300 is arranged on the wind turbine blade 22 and the base 360 is caused to contract, one row extends along the leading edge of the wind turbine blade and the other row extends along the trailing edge 270 of the wind turbine blade.

The protrusions 370 may help to create turbulent air flow, provoking earlier local flow separation, increasing the drag and reducing the lift. The protrusions may thus may help to reduce VIVs and/or SIVs.

The device 300 may comprise more than two rows 393. For example, three, four, five or more rows 393 of protrusions 370 may be provided. The rows 393 may extend in a spanwise direction when the device 300 is in use.

Including protrusions to be placed over a pressure 240 and/or a suction 250 side of a blade 22 may enhance the effect of creating turbulence and therefore decreasing stall and coherence between vortex sheddings.

In some other examples, the protrusions 370 are not arranged in spanwise rows 393. Different arrangements of the protrusions 370 may be provided.

The protrusions 370 may be configured to have a same shape when the device 300 is in the inactive state than when it is in the active state. For example, protrusions 370 may have an elongated protruding shape regardless the state (inactive or active) in which the device is. The protrusions 370 may comprise one or more materials conferring certain sturdiness to it. Therefore, as the device is robust, once the device 300 is tightened around the wind turbine blade 22, the functionality of altering the air flow around the blade is immediately obtained.

In some other examples, the protrusions 370 are inflatable structures 430 and can therefore be inflated. A protrusion 370 may include an internal chamber 420 and a wall 410. It may be understood that the wall 410 delimits, at least in part, the chamber 420. The wall 410 is joined to the base 360. When air or a suitable gas, e.g. carbon dioxide, helium or nitrogen, is introduced in the internal chamber 420, the wall 410 is pushed and the protrusion 370 is inflated. A gas, or in general a fluid, may be suitable if it is able to push the walls 410 and inflate the inflatable structure.

The base 360 may be first fitted around the wind turbine blade by making the base 360 to contract and then the protrusions 370 may be inflated. The protrusions 370 may be inflated one by one, e.g. one after the other. But if their internal chambers 420 are connected, i.e. there is effectively a single internal chamber over the base 360, the protrusions 370 may me be inflated substantially at a same time. Or at least, all the protrusions 370 may be inflated by using a single gas inlet.

Still in some other examples, it may be possible that the protrusions 370 include a shape memory material, and the protrusions 370 are caused to protrude from the base 360 when applying a stimulus to the base 360. In these examples, the protrusions 370 would be retracted in the inactive state of the device, and they would extend when the device transitions to an active state, e.g. by heating the device 300 or the base 360.

Still in some other examples, the base 360 may be inflatable. The base 360 may be configured to be inflated separately from the protrusions 370, or they may be provided in a single piece and they may be inflated together.

Still in some other examples, the base 360 may be caused to transition from the inactive state to the active state by applying vacuum to the base 360. For example, a pneumatic pump may be used for causing the base 360 to grip the wind turbine blade 22. The base 360 may be configured to this end, e.g. the base may be configured for creasing and shrinking around the blade 22 when vacuum is applied to it. The base 360 may have a valve to connect a vacuum pump for applying vacuum. The base 360 may be seen as a vacuum chamber in some examples. The base 360 may comprise more than one vacuum chambers in other examples. In general, a device 300 may comprise one or more vacuum chambers, and the device 300 may be configured to transition from an inactive state to an active state by applying vacuum to the one or more vacuum chambers.

It is noted that the device 300 of FIGS. 4A-4D may be provided similarly to the device of FIGS. 5A to 5D in that the body 310 of the device 300 may comprise a base 360 and a protrusion 370. The description of the base 360 and a protrusion 370 in connection with FIGS. 5A to 5D may apply to this other example of device. A cross-section of this device is illustrated in FIG. 4E. Therefore, protrusions 370 may be sturdy and have its functional shape already in the inactive state of the device 300, or protrusions 370 may be inflatable and the air disturbing functionality may e.g. be obtained after the device is transitioned to the active state by inflating the protrusions, or protrusions 370 may comprise a shape memory material and its functionality may be gained when changing from the inactive to the active state of the device 300. Vacuum may be applied to the body 310 or to the base 360 for causing the device 300 to grip the blade 22.

Also, the device of FIGS. 4A-4D may be totally or partially inflatable. For example, the device may comprise an internal fluid chamber 420 and one or more walls 410 delimiting the fluid chamber. When a suitable fluid, e.g. a suitable gas, is introduced in the fluid chamber, the wall(s) expand and the device adopts its spiral or helical shape. The device therefore attaches more firmly to the blade 22. The device 300 may comprise more than one fluid chamber. A cross-section of the device may be non-constant along a length of the device. For example, inflating one or more fluid chambers may cause that a height 320 of the device in cross-section varies along the length of the device. The device may therefore acquire a bellow shape.

The device 300 of FIGS. 5A to 5D may be attached for example to a tip region 225, for the reasons already mentioned before. Likewise, more than one device 300 may be fitted to the wind turbine blade 22 in a spanwise direction for acting on the air flow at two different local positions along the blade. For example, a device such as the one in FIG. 5A may be provided at the tip region 225 for increasing damping, and a device such as the one in FIG. 6A may be provided closer to the root 210 for decreasing vortex street formation. Two consecutive devices of FIGS. 5A-5D may in some examples be separated between 0.5 and 10 chord lengths 285, and more in particular between 0.5 and 5 chord lengths 285, one chord length being understood as an average chord length of the blade.

Figure 6A:
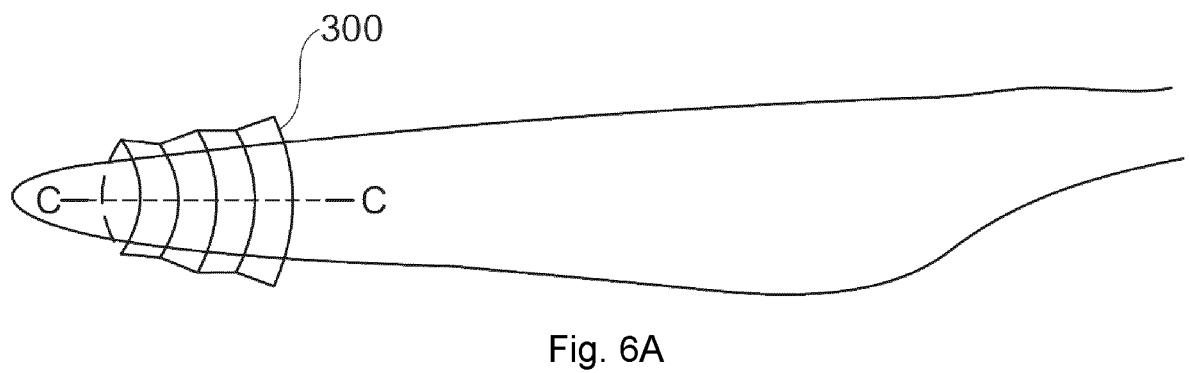

Still another example of device 300 configured to disturb the air flowing around a wind turbine blade is provided in FIG. 6A.

The device 300 of FIG. 6A comprises one or more inflatable structures 430. The device 300 may be configured to transition from the inactive state to the active state by inflating the inflatable structures. FIGS. 6B and 6C show two examples of cross sections along line C-C of FIG. 6A. In FIG. 6B, the device 300 comprises four inflatable structures 430. In FIG. 6C, the device 300 comprises a single inflatable structure 430. An inflatable structure may comprise one or more walls 410 delimiting an internal chamber 420. As explained with respect to protrusions 370 of FIGS. 5A-5D, air or in general any suitable fluid, e.g. any suitable gas, may be introduced in the chamber(s) 420 for inflating the structure(s) 430, and thus the device 300.

The device 300 may have a blade side 421, an outer side 422 which is opposite to the blade side 421, and two lateral sides 423, 424. The blade side 421 is configured to face an outer surface of a wind turbine blade 22. If the device 300 includes more than one inflatable structure 430, it may have one or more internal sides 425. These sides 421, 422, 423, 424, 425 may form the walls that delimit each chamber 420. For example, as it may be seen in FIG. 6B, lateral side 423, a portion of the blade side 421, an internal side 425 and a portion of the outer side 422 form the walls that enclose an internal chamber 420.

In an inactive state, the device 300 is deflated. Introducing air or a suitable fluid or gas in the chamber(s) 420 causes the device 300 to transition to the active state. The air introduced in the chamber(s) 420 presses the blade side 421 of the device against an outer surface of the blade 22. The device 300 therefore grips the blade 22.

An outer side 422 of the device 300 may be configured to have an accordion, wavy, serrated or zigzag shape in the activated state. Thus, when in use, the air flow is presented with irregularities along its path over the device 300. Such a shape of the outer side 422 may promote turbulence creation, and thus may help to mitigate VIVs.

The device 300 may be or may include a multistable inflatable structure. A multistable, e.g. a bistable, structure may comprise a plurality of relatively rigid two-dimensional panels linked by flexible joints or hinges. When inflated, e.g. by compressed air, the device unfolds and locks into a three-dimensional structure. A gas canister may be used for inflating the structure. Due to the rigidity and geometry of the panels, the shape of the device in the active state is not lost when removing the inflating source, and keeping an inflating gas inside the device, such as with common inflatable devices, is not required. Herein, a common inflatable device may mean a device that loses its shape if the inflating gas is not kept trapped inside the device, e.g. by a gas stopper or a plug. Therefore, a common inflatable device may be a monostable structure.

If a common or monostable inflatable device is used, a fluid or gas supply device may be provided with the device to compensate for fluid or gas leaks from the device, and thus the change of its shape in the activated state.

In FIGS. 6A-6C, the device 300 is provided in a closed configuration. In other examples, the device 300 may be provided in an open configuration, as in FIG. 5B. I.e., the device may comprise two edges 365, 366 configured to extend in a substantially spanwise direction.

A device with a shape as what has been described with regard to FIGS. 6A-6C may also be obtained by incorporating a base 360 including a shape memory material, the inflatable structures 430 being arranged on/around the base 360, see e.g. FIGS. 6D and 6E. The base 360 may also be configured to be attached by applying vacuum. The concept of the multistable inflatable structure may be applied to other shapes of the device too. For example, a device as or similar to the one shown in FIG. 4A may be obtained by a multistable structure. In general, a device 300 may comprise or may be formed by a multistable structure and the device may be caused to transition from the inactive state to the active state by inflating the multistable structure.

A wind turbine blade 22 comprising one or more of the devices 300 as described above attached to it may be provided. The one or more devices may grip the wind turbine blade, e.g. they may be fitted around the wind turbine blade. The device may be in the active state.

Figure 7:
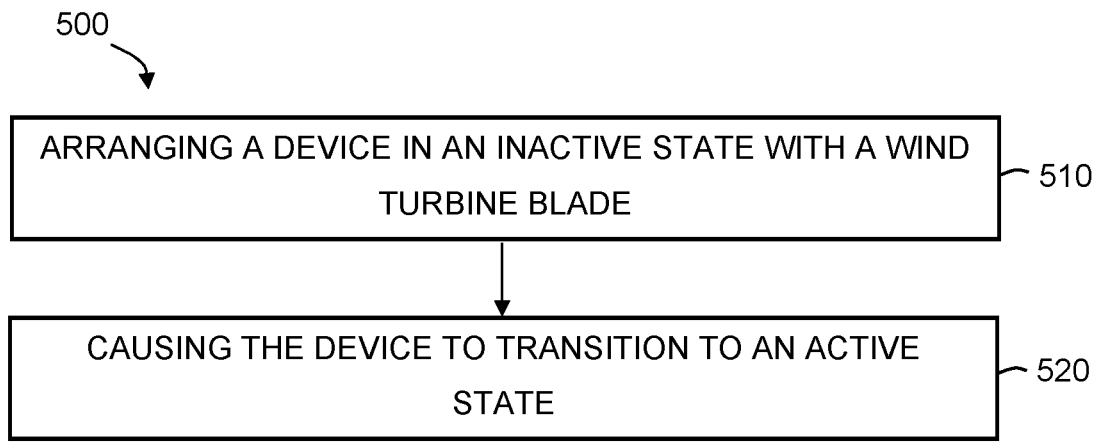
FIG. 7 schematically illustrates a flow chart of a method for mitigating vibrations of a parked wind turbine.

In a further aspect, a method 500 for mitigating vibrations in a parked wind turbine 10 is provided. The method, which is schematically illustrated in FIG. 7, may be used particularly during installation and/or during commissioning of the wind turbine. The method may also be used when the wind turbine may be stopped after it has been operating (i.e. producing energy), e.g. during maintenance or repair.

The method comprises, at block 510, arranging a device 300 as described herein in an inactive state with a wind turbine blade 22. The wind turbine blade 22 comprises a root, a tip and exterior surfaces defining a pressure side 240, a suction side 250, a leading edge 260 and a trailing edge 270, each surface extending in a generally spanwise direction from the root the tip. Any of the devices described above with regard to FIGS. 4A-6E may be used.

A device 300 may be arranged around a wind turbine blade 22. For example, arranging may comprise sliding the device 300 along the blade. A device such as the one in FIG. 5A, 5B or 6A may e.g. be arranged surrounding a tip region 225 of the blade 22 and then may be slid in a spanwise direction. In some other examples, the device may be simply rested against the blade or placed over the blade 22. For example, instead of being slid in a spanwise direction, the device 300 of FIG. 4A may be rested against or placed over the blade 22, e.g. as a substantially straight element. The device may be then curved by activating it. A device 300 may be particularly placed around a tip region 225, as it may be the portion of the blade 22 more prone to vibrating.

The method further comprises, at block 520, securing the device 300 to the wind turbine blade 22 by causing the device 300 to transition from the inactive state to an active state, wherein the device grips the blade more firmly in the active state than in the inactive state.

Causing the device to transition from the inactive state to an active state may comprise stimulating a shape memory material of the device 300. For example, a shape memory material may be stimulated by heating it or illuminating it with light from a suitable wavelength. An activating element, e.g. a heating element 340, may be used in some examples for activating, e.g. heating, the shape memory material. Other options for stimulating the shape memory material may be applying an electric or a magnetic field.

Figure 4C:
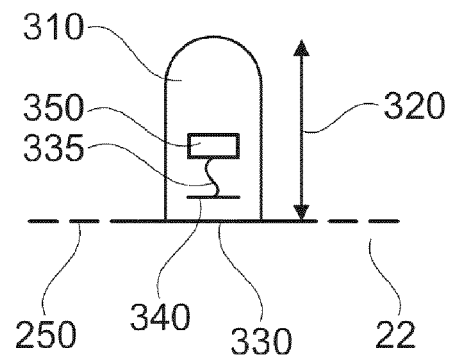

All the device 300 may be stimulated for changing its shape and/or shrinking it if it is entirely made from one or more shape memory materials, as e.g. the device of FIGS. 4B-4D. Only a portion of the device 300 may be stimulated in other examples. For example, a base 360 of the device of FIG. 5A or 5B may be stimulated.

Causing the device 300 to transition from the inactive state to an active state may comprise inflating at least a portion of the device. For example, the device 300 may be inflated by introducing a suitable fluid, e.g. a suitable gas, into one or more inflatable structures 430, as explained with respect to FIGS. 6A-6C. If multistable, e.g. bistable, structures are used, they may similarly be inflated.

Causing the device to transition from the inactive state to an active state may comprise applying vacuum to at least a portion of the device 300. The device may comprise one or more vacuum chambers to which vacuum may be applied. For example, a pneumatic pump may be connected to a valve of a base 360, and applying vacuum may cause the base 360, and thus the device 300, to crease and shrink around the blade 22.

If the transitioning to the active state does not enable the device or a portion thereof to modify the air flow around a wind turbine blade 22, the method may further comprise activating the air flow modifying elements. For example, protrusions 370 or structures 430 may be inflated.

Additional devices 300 may be arranged and secured to the blade too. Two consecutive devices 300 may be separated between one and five chord lengths 285 along a length of the blade, e.g. two devices as in FIG. 4A or two devices as in FIG. 6A. In other examples, two consecutive devices 300 may be separated between one and five chord lengths 285 in a spanwise direction, e.g. two devices as in FIGS. 5A and 5B. Combining devices 300 of different types, e.g. devices of different examples, may be possible.

The steps of arranging 510 and securing 520 may be performed on the ground, e.g. after a blade 22 and a device 300 have arrived at a wind turbine installation site. In some other examples, these steps 520, 530 may be performed onto a blade 22 already attached to a hub 20 on top of a wind turbine tower 15, e.g. if the wind turbine 10 has been stopped for maintenance or simply if it has been decided to install first a blade 22 and then to attach the device 300 to it. Still in some other examples, these steps may be performed before transporting a wind turbine blade 22 to an installation site. For example, one or more devices, e.g. inflatable devices, may be arranged an secured to the blade before carrying it to the installation site. The devices 300 may protect the blade while it is stored and/or transported.

If the device 300 is arranged and secured on an uninstalled blade 22, the method may further comprise installing the wind turbine blade 22. The blade 22 may be first attached to the hub 20 and the hub 20 and the blade 22 may be lifted together, or the hub 100 may be mounted first and then the blade 22 with the device 300 may be lifted and connected to the hub 20.

Once the blade 22 with the device 300 is mounted to the wind turbine, the air flow modifying elements 310, 370, 430 may reduce wind turbine 22 vibrations, e.g. vortex induced vibrations and/or stall induced vibrations.

The device 300 may stay gripped around the blade 22 until operation of the wind turbine is started or resumed. The method may further comprise removing the device 300 from the wind turbine blade 22 before starting operation.

Removing a device 300 may be performed in different ways. If the device 300 comprises a removable attachment 395, removing may comprise detaching a removable attachment 395. For example, a zipper or hook-and-loop fasteners may be detached. If the device 300 includes a frangible pattern, tearing the pattern may separate the device from the blade. If the device has been inflated, the air or gas trapped in one or more chambers 420 may be released. A valve of an inflatable structure 430 may be opened to do so, or a wall 410 may be pierced. If vacuum has been applied, a valve of a vacuum chamber may be opened to let air in. For example, a valve of a base 360 may be opened to release the device 300 from a blade 22. In case of a multistable structure, suctioning the air or gas may be needed to allow the device to fold along the flexible joints joining the pieces forming the walls of the device. If the device includes memory shape material, the memory shape material may be stimulated to revert to the inactive state of the device. Other ways of removing a device from the blade may be possible.

Figure 8:
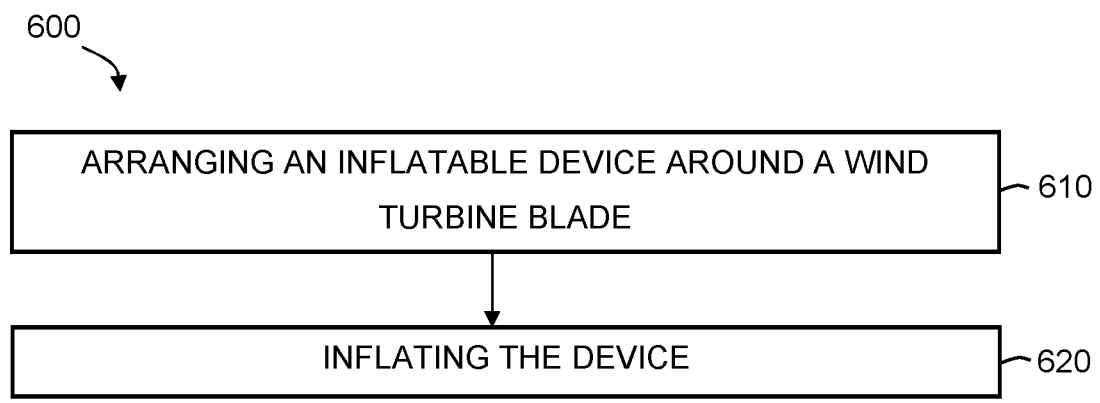
FIG. 8 schematically illustrates a flow chart of another method for mitigating vibrations of a parked wind turbine.

Still in a further aspect of the invention, another method 600 for mitigating vibrations of a parked wind turbine is provided. The method is schematically illustrated in FIG. 8. Any of the devices described with respect to FIGS. 4A-6E may be used in this method.

The method comprises, at block 610, arranging an inflatable device 300 around a wind turbine blade 22. An inflatable device 300 described with respect to FIGS. 6A, 6B and 6C may for example be used.

The device 300 may be a monostable device. I.e., if a fluid or gas with which the device is inflated leaves an internal chamber 420 of the device, the device loses its shape.

The device 300 may be a multistable, e.g. a bistable device. In this case, the shape of the device is not lost when the inflated configuration is achieved.

An outer surface 422 of the inflated device may have a zigzag or a similar shape, as described before with respect to FIGS. 6A, 6B and 6C. Such a shape may help to disturb the air flow and make it more turbulent.

The method further comprises, at block 620, inflating the device. Therefore, the device changes from a deflated state to an inflated state, and the device presses against the wind turbine blade 22 more firmly in the inflated state than in the deflated state. Inflating the device enables the device to disturb air flow around the wind turbine blade.

A suitable fluid, e.g. a suitable gas, may be introduced in one or more inflatable structures 430. Compressed air may for example be used to inflate a multistable structure. A gas cartridge may be used.

The device 300 may be arranged around a tip region 225 of the wind turbine blade 22. More than one device may be attached to the wind turbine blade. The device(s) 300 may be removed from the blade 22 before the wind turbine starts or resumes operation.

The explanations provided with respect to FIGS. 6A-6C and the explanations of method 500 regarding these figures may be applied to method 600.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A device (300) for mitigating vibrations of a parked wind turbine (10), comprising:
   one or more airflow modifying elements (310, 370, 430),
   wherein the device is configured to transition from an inactive state to an active state,
   wherein the device is configured to grip a wind turbine blade (22) more firmly in the active state than in the inactive state,
   wherein the device is configured such that the one or more airflow modifying elements (310, 370, 430) extend circumferentially around the wind turbine blade (22), and
   wherein the device is configured to grip the wind turbine blade (22) along a spanwise length of the device in the active state, wherein the device (300) comprises a shape memory material, and the device is configured to transition from the inactive state to the active state in response to activation of the shape memory material.

2. The device of claim 1, wherein the device (300) comprises one or more inflatable structures (430), and the device (300) is configured to transition from the inactive state to the active state by inflating the inflatable structures (430).

3. The device of claim 1, wherein the device (300) has a spiral or a helicoidal shape in the active state.

4. The device of claim 1, wherein the device comprises a base (360) configured to face a surface of a wind turbine blade (22).

5. The device of claim 1, wherein the device (300) further comprises a plurality of protrusions (370) configured to protrude away from the surface of the wind turbine blade (22) in the active state.

6. The device of claim 4, wherein the protrusions (370) are inflatable structures (430).

7. The device of claim 4, wherein the protrusions (370) are configured to be arranged along at least the leading edge (260) of a wind turbine blade (22) in the active state.

8. A wind turbine blade (22) comprising one or more of the device (300) according to claim 1.

9. A method (500) for mitigating vibrations in a parked wind turbine (10), the method comprising:
   arranging (510), with a wind turbine blade (22), a device (300) in an inactive state, wherein the device (300) comprises one or more airflow modifying elements (310, 370, 430); and
   securing (520) the device (300) to the blade (22) by causing the device (300) to transition from the inactive state to an active state, wherein the device (300) grips the wind turbine blade (22) more firmly in the active state than in the inactive state,
   wherein the one or more airflow modifying elements (310, 370, 430) extend circumferentially around the wind turbine blade (22), and wherein the device (300) grips the wind turbine blade (22) along a spanwise length of the device (300) in the active state, wherein causing the device (300) to transition from the inactive state to the active state comprises stimulating a shape memory material of the device (300).

10. The method of claim 9, wherein causing the device (300) to transition from the inactive state to the active state comprises inflating at least a portion of the device (300).

11. The method of claim 9, further comprising activating the air flow modifying elements (370).

12. The method of claim 9, wherein the arranging of the device (300) comprises sliding the device (300) along the blade (22).

13. The method of claim 9, further comprising removing the device (300) from the wind turbine blade (22) before starting operation of the wind turbine (10).

14. A device (300) for mitigating vibrations of a parked wind turbine (10), comprising:
 one or more airflow modifying elements (310, 370, 430),
  wherein the device is configured to transition from an inactive state to an active state,
 wherein the device is configured to grip a wind turbine blade (22) more firmly in the active state than in the inactive state,
 wherein the device (300) comprises a shape memory material, and
 wherein the device (300) is configured to transition from the inactive state to the active state in response to activation of the shape memory material.

* * * * *